United States Patent
Hoang

(10) Patent No.: US 6,229,852 B1
(45) Date of Patent: May 8, 2001

(54) REDUCED-MEMORY VIDEO DECODER FOR COMPRESSED HIGH-DEFINITION VIDEO DATA

(75) Inventor: Dzung Tien Hoang, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/178,960

(22) Filed: Oct. 26, 1998

(51) Int. Cl.[7] ............................................ H04N 7/36
(52) U.S. Cl. ................... 375/240.25; 375/240.14; 375/240.24
(58) Field of Search ................... 348/403, 415, 348/416, 400, 401, 402, 405, 412, 393, 500; 382/233; 375/240.02, 240.03, 240.04, 240.05, 240.14, 240.15, 240.26, 240.25; H04N 7/50

(56) References Cited

U.S. PATENT DOCUMENTS

| | | |
|---|---|---|
| 5,262,854 | 11/1993 | Ng . |
| 5,485,280 | 1/1996 | Fujinami et al. . |
| 5,539,466 * | 7/1996 | Igarashi et al. ................... 348/401 |
| 5,544,266 * | 8/1996 | Koppelmans et al. ............ 382/238 |
| 5,623,312 * | 4/1997 | Yan et al. ......................... 348/416 |
| 5,701,159 * | 12/1997 | Ohira et al. .................. 375/240.12 |
| 5,729,293 * | 3/1998 | Keesman .......................... 348/401 |
| 5,764,298 * | 6/1998 | Morrison ......................... 348/500 |
| 5,784,107 * | 7/1998 | Takahashi ........................ 348/412 |
| 5,786,856 * | 7/1998 | Hall et al. ........................ 348/403 |
| 5,796,435 * | 8/1998 | Nonomura et al. ............... 348/405 |
| 5,805,224 * | 9/1998 | Keesman et al. ................. 348/405 |
| 5,818,530 * | 10/1998 | Canfield et al. .................. 348/400 |
| 5,825,424 * | 10/1998 | Canfield et al. .................. 348/416 |
| 5,847,762 * | 12/1998 | Canfield et al. .................. 348/415 |
| 5,920,353 * | 7/1999 | Diaz et al. ....................... 348/402 |
| 5,940,130 * | 8/1999 | Nilsson et al. ................... 348/416 |
| 6,018,366 * | 1/2000 | Asai et al. ........................ 348/394 |

FOREIGN PATENT DOCUMENTS

| | | | |
|---|---|---|---|
| 0 687 111 A2 | 12/1995 | (EP) | ............... H04N/7/24 |
| 0 782 345 A2 | 7/1997 | (EP) | ............... H04N/7/50 |
| 0 794 672 A2 | 9/1997 | (EP) | ............... H04N/7/26 |

OTHER PUBLICATIONS deWith et al., *An MPEG Decoder with Embedded Compression for Memory Reduction*, XP–002129587.
International Search Report, PCT/US99/23666, mailed Feb. 18, 2000.

* cited by examiner

*Primary Examiner*—Howard Britton
(74) *Attorney, Agent, or Firm*—Wood, Herron & Evans L.L.P.

(57) ABSTRACT

A video decoder for decoding compressed high-definition video data. The video decoder includes compress and decompress circuits placed in the decoder's datapath to reduce the amount of video data that needs to be stored in frame buffer memory. Reference frame video data is compressed by the compress circuit for storage in frame buffer memory. A rate control circuit is provided to control the rate at which the compress circuit stores reference frame video data in the frame buffer memory. The decompress circuit reconstructs the reference frames on-the-fly for use in motion compensated prediction. Methods of decoding compressed high-definition video signals are also disclosed.

31 Claims, 3 Drawing Sheets

REDUCED-MEMORY VIDEO DECODER FOR COMPRESSED HIGH-DEFINITION VIDEO DATA

FIELD OF THE INVENTION

The present invention relates generally to decoding of digitally encoded video signals and, more particulary, to a video decoder and method for decoding compressed high-definition video data.

BACKGROUND OF THE INVENTION

Digital encoding and decoding of high-definition video signals provides higher image resolution and more effective control of the storage, manipulation and display of the video signal over existing analog NTSC and PAL video systems. In an HDTV broadcast environment, for example, digital video data is encoded at a transmission end in accordance with a specified compressed bitstream syntax, such as the MPEG-2 standard, and decoded at a receiving end in accordance with a specified decoding process. The decoded video signal is reconstructed at the receiving end into picture frames that may be presented for display in a sequence with an HDTV resolution of 1920×1080 for example, or down-converted to a standard NTSC resolution of 720×480.

Decoding of compressed video signals is a memory-intensive process, especially for compressed high-definition video signals. Receivers adapted to decode compressed high-definition video signals generally require a significant amount of memory to store reference frame data and additional side information required in the decoding process. In the past, for example, a typical HDTV receiver for decoding a high-definition MPEG-2 video bitstream has required 12 MB or more of random-access-memory (RAM) to provide adequate memory storage of control information and reference frame video data in the receiver for reconstructing the transmitted picture frames.

Due to the relatively high cost of high speed memory, developers of HDTV receivers have sought to reduce the amount of memory required in the receiver for the decoding process. In the past, one approach has been to exploit only a portion of the compressed data in the transmitted HDTV signal to produce a decoded video signal representing an image of lesser resolution. For example, HDTV receivers have been designed in the past that decimate the decoded video data in accordance with a predetermined decimation scheme either before or after the inverse discrete transform function of the decoder to reduce the amount of video data that is stored in memory for reconstruction of the picture frames.

Decoded DCT coefficients may be decimated by masking a block of DCT coefficients of an 8×8 DCT coefficient array before the remaining coefficients are applied to the IDCT circuit of the decoder. Alternatively, particular rows and columns of pixel data generated by the IDCT circuit in an 8×8 pixel data array may be eliminated to reduce the amount of video data that must be stored. The reconstructed picture frames are then displayed at a lower NTSC resolution.

While this approach requires less memory in the decoder for reconstructing picture frames, the decimation scheme performed by the decoder may result in reduced picture quality as a portion of the decoded video data is eliminated during the decoding process. Furthermore, since only a limited portion of the decoded video data can be eliminated without completely sacrificing picture quality, the decimation scheme achieves only a modest amount of compression and is not readily adaptable for memory-scalable applications where the amount of decoder memory may vary among different decoding applications.

Thus, there is a need for a video decoder and method for decoding compressed high-definition video data that provides high quality reconstructed picture frames with an improved compression ratio. There is also a need for a video decoder and method for decoding compressed high-definition video data that reduces the amount of memory required in the decoder for reconstructing high quality picture frames. There is yet also a need for a video decoder and method for decoding compressed high-definition video data that provides memory-scalability for different decoding applications.

SUMMARY OF THE INVENTION

The present invention overcomes the foregoing and other shortcomings and drawbacks of compressed video signal decoders and decoding methods heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a reduced-memory video decoder and decoding method are provided for decoding compressed high-definition video data. The video decoder includes compress and decompress circuits placed in the decoder's datapath to reduce the amount of reference frame video data that needs to be stored in frame buffer memory for reconstructing the transmitted frames.

The video decoder includes a macroblock (MB) parser and VLD circuit for parsing the incoming compressed video bitstream and decoding the block-level quantized DCT coefficients and motions vectors that are required in the frame or field reconstruction process. The decoded DCT coefficients are applied to an inverse quantization (IQ) and inverse Discrete Cosine Transform circuit to generate pel values (I-frames) or pel prediction errors (P- and B-frames) for each block of video data. The decoded motion vectors are applied to a motion compensator circuit.

In accordance with the principles of the present invention, reconstructed I- and P-reference frame video data is compressed by the compress circuit for storage in the frame buffer memory. Preferably, compress circuit is DCT based and variable length encodes the DCT coefficients as run-length and amplitude level pairs according to a Huffman variable length code similar to that used in the MPEG-2 standard. During the decoding of predictive P- and B-frames, corresponding reference frame video data is retrieved from frame buffer memory and applied to a decompress circuit. The decompress circuit is adapted to reconstruct I- and P-reference frames on-the-fly for use in motion compensated prediction. Various rate control schemes are provided to control the rate at which the compress circuit stores the variable length encoded data of reference I- and P-frames in frame buffer memory.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiment given below, serve to explain the principles of the invention.

DETAILED DESCRIPTION OF SPECIFIC EMBODIMENTS

Figure 1:
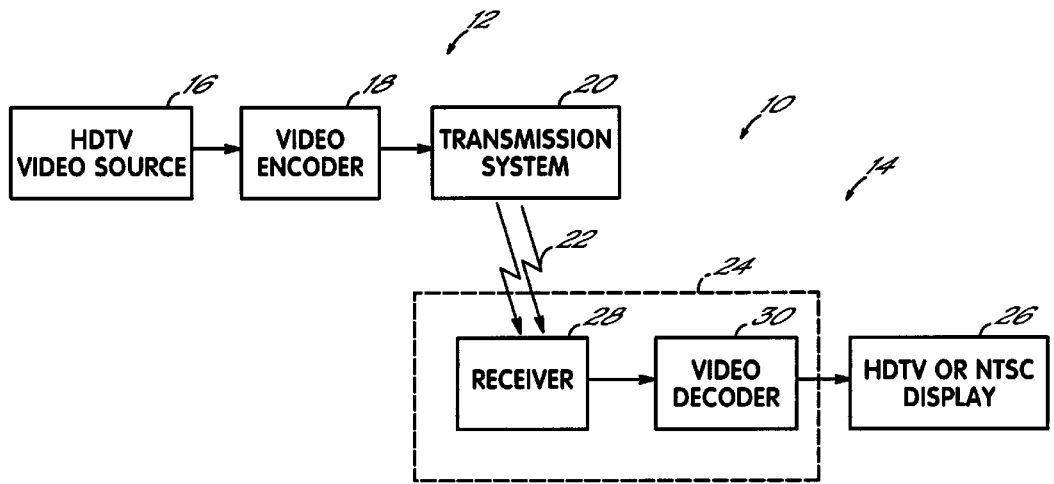
FIG. 1 is a block diagram illustrating transmitting and receiving ends in an HDTV broadcast environment.

With reference to the figures, and to FIG. 1 in particular, an HDTV broadcast environment 10 is shown including an HDTV signal transmitting end 12 and an HDTV signal receiving and display end 14. The transmitting end 12 includes an HDTV video source 16 for generating high-definition video data in an uncompressed format, a video encoder 18 for compressing the video data from HDTV source 16 into a video data bitstream that complies with a predetermined bitstream syntax, and a transmission system 20 for transmitting the compressed video data bitstream, represented diagrammatically by numeral 22, to the receiving and display end 14 of the HDTV broadcast environment 10. The video encoder 18 may compress the high-definition video data received from the HDTV video source 16 into an MPEG-2 compliant video data bitstream, as specified by the Moving Pictures Expert Group in ISO-13818-2, to remove spatial and temporal redundancies in the video data before it is transmitted in a compressed format by the transmission system 20. The transmission system 20 is adapted to transmit the compressed video data bitstream 22 through radio, satellite, cable or other suitable delivery means to the receiving and display end 14.

The receiving and display end 14 includes an HDTV receiver 24, such as a set-top-box converter, for receiving and decompressing the transmitted video data bitstream 22 to generate a sequence of picture frames for display on a TV or other suitable display 26. The HDTV receiver 24 includes a receiver 28 that is signal compatible with the transmission system 20 for receiving the transmitted video data bitstream 22. As will be described in greater detail below, a video decoder 30 receives the compressed video data bitstream from receiver 28 and decompresses the video data bitstream to reconstruct a sequence of Intra (I-), Predictive (P-) and Bidirectionally Predictive (B-) frames of picture data for presentation to display 26.

Video encoder 18 preferably uses the MPEG-2 bitstream syntax to compress video data from video source 16. The MPEG-2 standard defines a compressed bitstream format for video data and control information representing a sequence of images in six layers, including the sequence layer, the group of pictures (GOP) layer, the picture layer, the slice layer, the macroblock (MB) layer and the block layer. Each of these layers includes a unique start code which identifies the layer and provides either fixed length data values or variable length Huffman encoded data, or both, which must be a parsed and decoded by video decoder 30 at the receiving and display end 14 in accordance with the MPEG-2 decoding process. During the description to follow, the reader is hereby referred to ISO-13818-2 (MPEG-2) and the Test Model 5 Rate Control Model, each of which is expressly incorporated herein by reference in its entirety, for a more detailed description of the MPEG-2 bitstream syntax, MPEG-2 decoding process and implementation of the standard MPEG-2 encoder. It will be appreciated by those of ordinary skill in the art that while the MPEG-2 bitstream format and decoding process is described herein in accordance with one embodiment of the present invention, other compressed bitstream formats and decoding process standards are possible without departing from the spirit and scope of the present invention.

Figure 2:
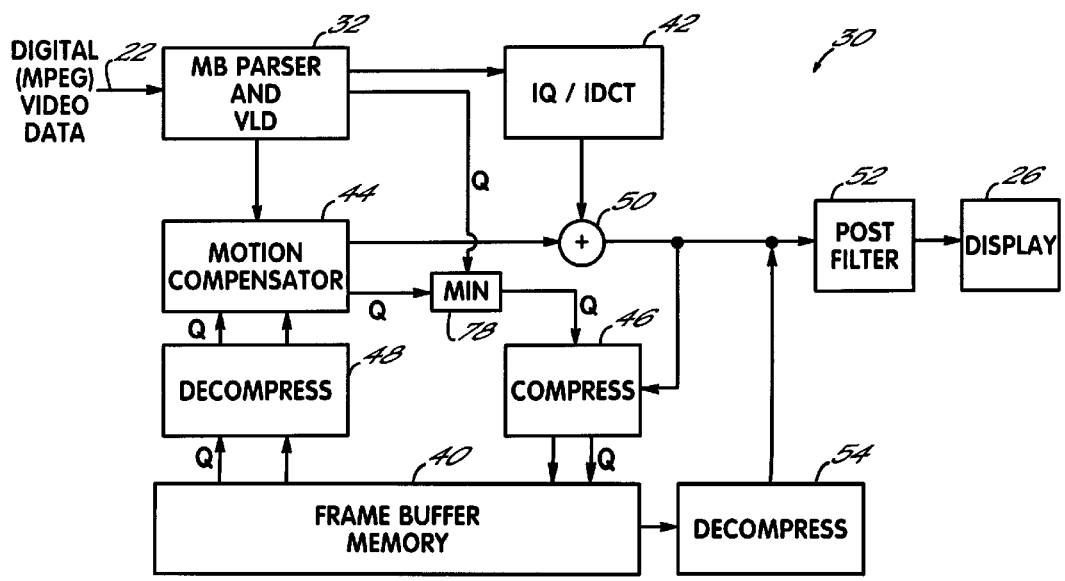
FIG. 2 is a block diagram illustrating a reduced-memory decoder for decoding compressed high-definition video data in accordance with the principles of the present invention.
Figure 3A:
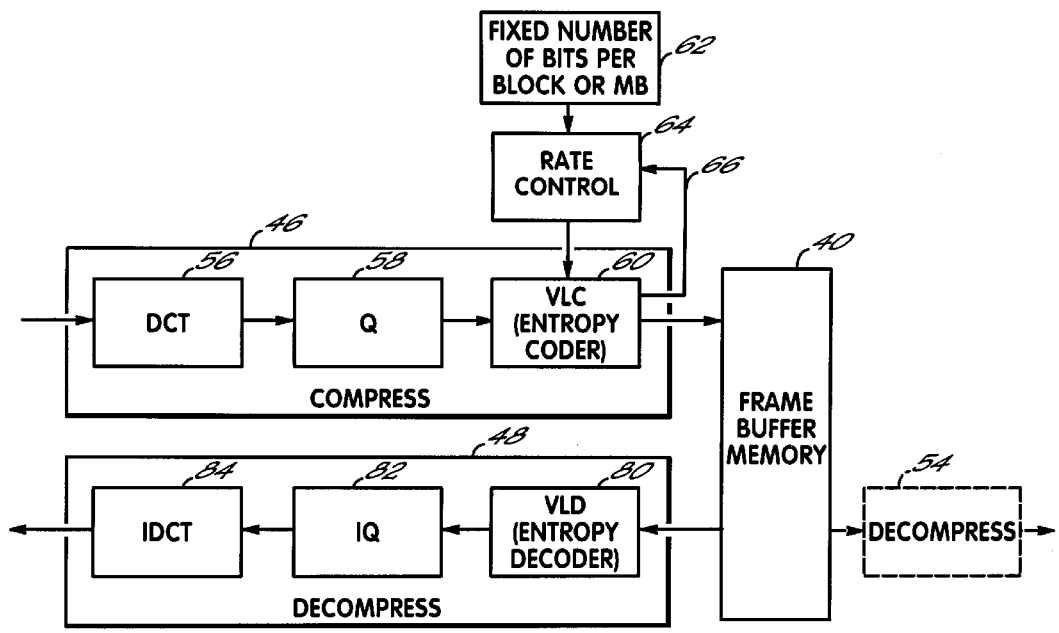
FIG. 3A is a partial block diagram of the video decoder shown in FIG. 2, illustrating the compress and decompress circuits of the decoder in greater detail with a fixed bit rate control scheme for storing compressed reference frame video data in frame buffer memory.
Figure 3B:
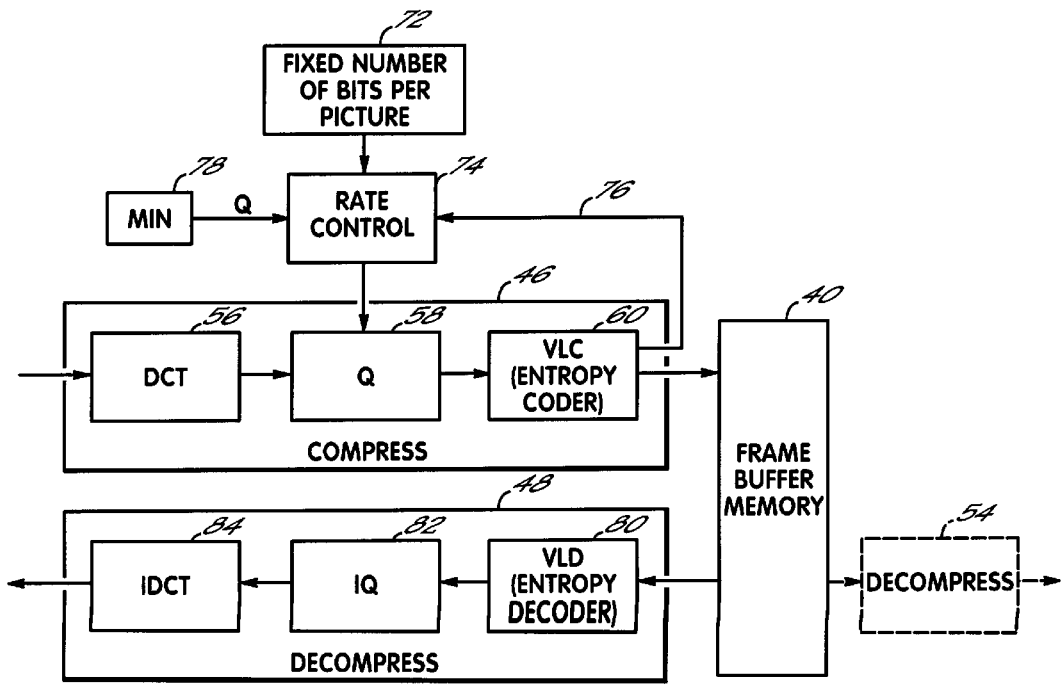
FIG. 3B is a partial block diagram similar to FIG. 3A, illustrating an alternative variable bit rate control scheme for storing compressed reference frame video data in frame buffer memory.

Video decoder 30 is the focus of the present invention and its operation and features are best understood with reference to FIGS. 2, 3A and 3B. Video decoder 30 is controlled by a processor (not shown) that controls the decoding process of the received video data bitstream 22 to reconstruct the I-, P-, and B-picture frames for sequential display as specified in the MPEG-2 standard. The high-definition video data bitstream 22 may be transmitted with an HDTV resolution of 1920×1080, while display 26 may be adapted to display the reconstructed picture frames with the same or a lesser resolution. For example, the decoded high-definition video data bitstream may be down-converted from the HDTV resolution of 1920×1080 to a lower NTSC resolution of 720×480 for display on a standard-definition (SD) TV.

With further reference to FIG. 2, video decoder 30 includes a macroblock (MB) parser and variable length decoder (VLD) circuit 32 for parsing the incoming compressed video data bitstream 22 and decoding the block-level quantized DCT coefficients and motion vectors that are necessary to reconstruct each frame or field. The compressed DCT coefficients and motion vectors are decoded using variable length code (VLC) tables defined in the MPEG-2 standard that are accessible by video decoder 30 during the decoding process.

Figure 4:
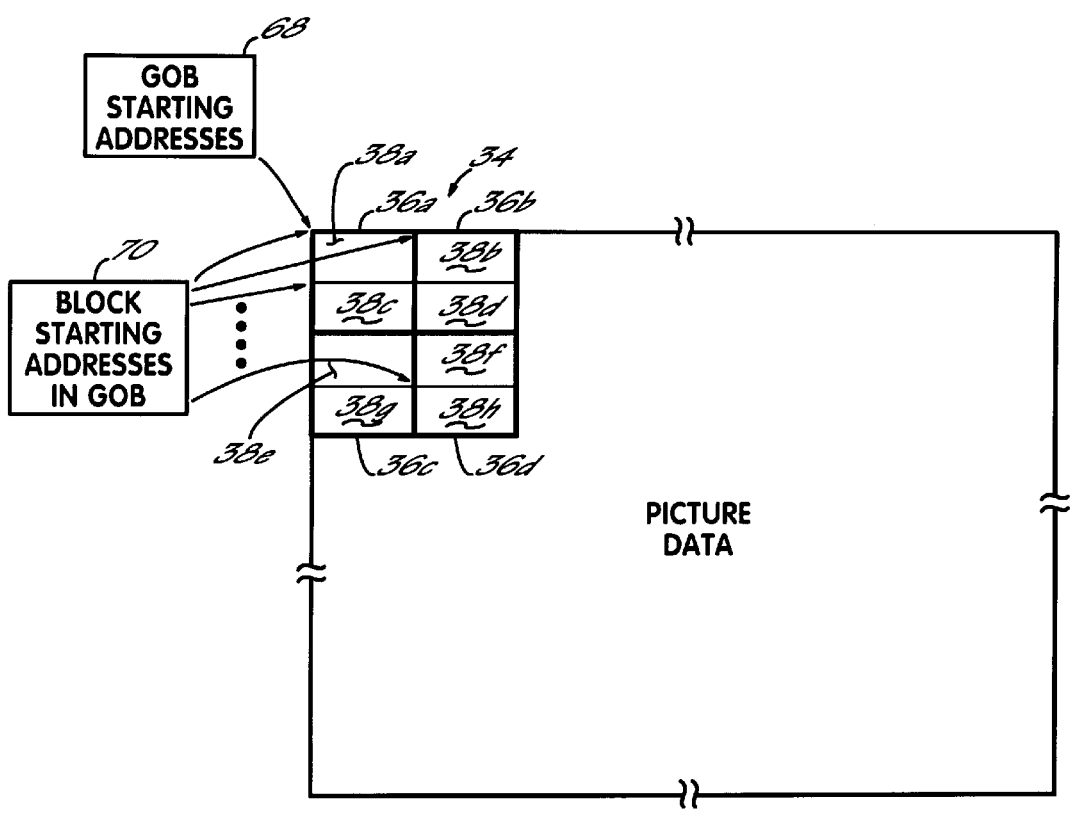
FIG. 4 is a diagrammatic representation of a single frame of video data.

In accordance with the MPEG-2 standard, each macroblock (MB) represents an image area covering a matrix of 16×16 pixels as represented by macroblock 34 of FIG. 4. Each macroblock 34 may comprise four (4) 8×8 blocks 36a–d of luminance information representing the 16×16 matrix of pixels, and two (2) 8×8 blocks of chrominance information (not shown) representing the 16×16 matrix of pixels. Alternatively, for interlaced video, a video frame is formed of two fields, one containing the even scan lines of a picture (the "top field") and one containing the odd scan lines of the picture (the "bottom field"). To permit processing of decoded reference frames uniformly as fields, regardless of whether those pictures were encoded as field or frame pictures, macroblock 34 may comprise eight (8) 8×4 blocks 38a–h of luminance information representing the 16×16 matrix of pixels, and four (4) 8×4 blocks of chrominance information (not shown) representing the 16×16 matrix of pixels in a 4:2:0 chrominance format. The video decoder 30 is adapted to decode each 8×4 transformed block of video data (DCT coefficients) to generate 8×4 blocks of reconstructed I-, P-or B-frame video data (pel values). The pel values for I- and P-frames are stored in a compressed format in frame buffer memory 40, while reconstructed B-frame pel data is presented for immediate display on display 26.

During reconstruction of the transmitted I-, P- and B-frames, decoded DCT coefficients are applied in an 8×4 array to an inverse quantization (IQ) and inverse Discrete Cosine Transform (IDCT) circuit 42 to generate pel values (I-frames) or pel prediction errors (P- and B-frames) for each block of video data, while decoded motion vectors are applied to a motion compensator circuit 44. The transmitted or encoded video data of a reference I-frame does not include motion vector data and, accordingly, each encoded block represents an 8×4 array of transformed pel values. Encoded video data representing P-frames includes blocks of video data not contained in reference I- or P-frames, as well pel prediction errors between the predicted frame and the last I- or P-reference frame. Video data representing encoded B-frames includes pel prediction errors between the predicted frame, the preceding reference frame and the following reference frame. Motion vectors are encoded to identify 8×8 or 8×4 blocks of reference frame video data from which the P- and B-frames are generated. The reference I- and P-frame blocks used to reconstruct the predictive frames most closely match the block currently being processed. Encoding and decoding of I-, P- and B-frames is described in detail in ISO-13818-2 to which the reader is referred.

In accordance with the MPEG-2 decoding process, the decoding sequence of the I-, P- and B-frames does not necessarily coincide with the display sequence of the frames. Thus, as described in greater detail below, video data of I- and P-reference frames is stored in a compressed format in frame buffer memory 40 until required for presentation to display 26 or for reconstruction of other predictive frames, while B-frames are reconstructed from stored I- and P-frames "on-the-fly" for immediate display.

With further reference to FIGS. 2, 3A and 3B, video decoder 30 includes a compress circuit 46 and a decompress circuit 48 in the datapath of the decoder 30 to reduce the amount of reference frame video data that needs to be stored in frame buffer memory 40 to reconstruct I-, P- and B-frames. For example, frame buffer memory 40 may have about 2–4 MB of dynamic random-access-memory (DRAM) for storing two reference frames of video data in a compressed format as well as other side information to permit reconstruction of the transmitted I, P- and B-frames as described in detail below. When I-frames are being processed, each decoded 8×4 block of DCT coefficients is applied from the MB parser and VLD circuit 32 to the IQ/IDCT circuit 42 for generating 8×4 blocks of pel values in the I-frame. The decoded pel values of the I-frame pass through an adder 50 to the compress circuit 46 where the 8×4 blocks of pel values are compressed by variable length Huffman encoding the pel values into run-length and amplitude level pairs before being stored in frame buffer memory 40.

The decoder 30 receives 8×4 blocks of P-frame DCT coefficients immediately after the I-frame from which the P-frame was predicted at the video encoder 18. The decoded DCT coefficients of the P-frame are applied to the IQ/IDCT circuit 42 to generate 8×4 blocks of pel prediction errors which are then applied to adder 50. The motion compensator circuit 44, responsive to decoded motion vectors from the MB parser and VLD circuit 32, accesses up to four blocks of compressed I-frame pel data from frame buffer memory 40 which are decompressed by decompress circuit 48 and applied to the motion compensator circuit 44. The motion compensator circuit 44 applies the corresponding decoded I-frame pel data to adder 50 which sums the I-frame pel data with the P-frame pel prediction errors applied from the IQ/IDCT circuit 42. The sums produced by the adder 50 are the pel values of the P-frame which are also preferably compressed by compress circuit 46 according to a variable length Huffman encoding scheme before being stored in frame buffer memory 40. B-frames are decoded similarly to P-frames, and the reconstructed B-frame pel data is applied to post filter 52 for immediate presentation to display 26.

Post filter 52 is provided to adjust the aspect ratio of the reconstructed I-, P- and B-picture frames, as well as to combine sub-picture information with the reconstructed I-, P- and B-frames. When I- and P-frame data is to be presented for display, the compressed I- and P-frame pel data from frame buffer memory 40 is decompressed by decompress circuit 54 and applied to post filter 52 for presentation to display 26.

Referring now to FIGS. 3A and 3B, the compress and decompress circuits 46 and 48 of video decoder 30 will be described in greater detail. Compress circuit 46 includes a Discrete Cosine Transform (DCT) circuit 56 that receives 8×4 blocks of I- and P-reference frame pel values from adder 50 and generates corresponding 8×4 blocks of DCT coefficients. DCT circuit 56 performs a 2-dimensional discrete cosine transform (DCT) on the reference frame pel values to map the spatial luminance and chrominance values into the frequency domain. The DCT coefficients are scanned generally from the lower frequencies to the higher frequencies and then applied to quantization (Q) circuit 58 for quantization as described in greater detail below. The Q circuit 58 unequally quantizes the DCT coefficients by a 2-dimensional quantization matrix according to spectral response of the Human Vision System. The quantized DCT coefficients are applied to a variable length code (VLC) entropy encoder circuit 60 where the DCT coefficients are run-length encoded before being stored in frame buffer memory 40.

Several schemes are contemplated to control the rate of bits applied to the frame buffer memory 40. As best understood with reference to FIG. 3A, one approach is to provide a fixed number of bits ("M") per block of encoded DCT coefficients. The fixed bit value allocated per block of video data may be stored in a register, represented by numeral 62, and applied to a rate control circuit 64. A feedback loop 66 is applied from the VLC entropy encoder 60 to the rate control circuit 64 to enable the rate control circuit 64 to monitor the number of bits generated by the VLC entropy encoder 60 per block of video data. Encoding of the block video data stops at the last symbol generated before the allocated number of bits is exceeded by the VLC entropy encoder 60. Only the first "M" bits of the encoded representation are stored for each block of video data, where "M" is suitably chosen to meet memory requirements. Because the DCT coefficients are generally encoded from the lower frequencies to the higher frequencies, only higher frequency coefficients may be dropped during the encoding process that will have less impact on picture quality. This approach also has the advantage that compressed I- and P-frame reference blocks can be quickly accessed in frame buffer memory 40 for reconstruction of the predictive P- and B-picture frames during the decoding process.

With further reference to FIG. 3A, an alternative bit rate control approach is to provide a fixed number of bits ("N") per macroblock of encoded DCT coefficients, while permitting a variable number of bits per block. The fixed bit value allocated per macroblock of video data may be stored in a register, also represented by numeral 62, of the video decoder 30 and applied to the rate control circuit 64. The blocks of video data in a macroblock are variable length encoded in parallel. Feedback loop 66 enables the rate control circuit 64 to monitor the number of bits generated by the VLC entropy encoder 60 per macroblock of video data. Encoding of the macroblock video data also stops at the last symbol generated before the allocated number of bits is exceeded by the VLC entropy encoder 60. Only the first "N" bits of the encoded representation are stored for each macroblock of video data, where "N" is suitably chosen to meet memory requirements. Because less spatially complex blocks will be encoded before other blocks, the more spatially complex blocks will be allocated more bits during the encoding process. Therefore, more bits are allocated in frame buffer memory 40 for spatially complex I- and P-frame reference blocks, while less spatially complex blocks are represented with a lesser number of bits.

To permit quick access of the I- and P-frame reference blocks in frame buffer memory 40, a small look-up table 68 (FIG. 4) of Group of Block (GOB) starting addresses is stored in data cache of the processor (not shown) that controls video decoder 30. The starting address for each block of reference frame video data is stored in a table 70 of offset values stored at the beginning of the GOB data.

According to another contemplated bit rate control scheme, as best understood with reference to FIG. 3B, a global bit rate approach is provided that permits a variable number of bits to be allocated per macroblock, with a fixed number of bits allocated per picture. The fixed bit value allocated per picture may be stored in a register, represented by numeral 72, of the video decoder 30 and applied to a rate control circuit 74. In this approach, the rate control circuit 74 acts as virtual buffer that fills with bits generated by the VLC entropy encoder circuit 60 and empties at a constant rate so the total number of bits that gets emptied from the virtual buffer is the same as the allocated number of bits in memory. In this way, the VLC entropy encoder circuit 60 generates bits at a constant rate to frame buffer memory 40 to generally consume the total number of bits allocated in frame buffer memory 40 for storage of reference frame video data. A feedback loop 76 enables the rate control circuit 44 to monitor the number of bits generated by the VLC entropy encoder 60 per picture of video data.

To provide a constant bit rate without overfilling or underfilling the virtual buffer, the rate control circuit 74 proportionally adjusts the quantization scale Q applied by Q circuit 58 to each block of DCT coefficients in the compress circuit 46. During the decoding process performed by video decoder 30 (FIG. 2), the MB parser and VLD circuit 32 obtains the quantization scale (Q) used by video encoder 18 (FIG. 1) to encode each macroblock of DCT coefficients, and applies this quantization scale to a minimum (MIN) circuit 78 (FIG. 2). As reference blocks of video data are retrieved from frame buffer memory 40 for reconstruction of P-frames, up to four blocks of reference frame video data may be decompressed by decompress circuit 48 and applied to motion compensator circuit 44, with each block having stored with it the quantization scale Q used by video encoder 18 to compress the block of reference frame video data. The motion compensator circuit 44 computes the minimum of the possible four quantization scales Q applied from decompress circuit 48, and applies the minimum Q to the MIN circuit 78. The MIN circuit 78 applies the lower of the two quantization scales to the rate control circuit 74 as best understood with reference to FIG. 3B. In this way, the lowest quantization scale Q will be used by compress circuit 46 to compress each corresponding block of reference frame video data to allocate more bits for spatially complex blocks.

The rate control circuit 74 normalizes the fullness of the virtual buffer from a minimum of 1 to a maximum of 31 so the virtual buffer fullness is normalized to the same range as the quantizer scale. The quantization scale Q applied by MIN circuit 78 to the rate control circuit 74 is multiplied by this proportionality constant and applied as a proportional quantization scale Q to the Q circuit 58 of compress circuit 46. In this way, Q circuit 58 quantizes the block of reference frame DCT coefficients proportionally to the quantization scale Q used by video encoder 18 to encode the block of reference video data before the DCT coefficients are encoded and stored in frame buffer memory 40. The proportionality constant generated by the rate control circuit 74 provides a higher quantization scale when the virtual buffer is full to reduce the number of bits generated by the VLC entropy coder 60. The advantage of this approach is that the macroblocks of DCT coefficients may encoded with a variable number of bits according to their spatial complexity while maintaining a fixed number of bits per frame. The global bit rate scheme assures that the number of bits generated by VLC entropy coder 60 will generally match the number of bits allocated in frame buffer memory 40. A similar addressing scheme as discussed above will enable quick random access of reference frame video from frame buffer memory 40.

With further reference to FIGS. 3A and 3B, the decompress circuit 48 includes a variable length decoder (VLD) circuit 80 for decoding the compressed reference frame DCT coefficients and side information stored in frame buffer memory 40. The decompress circuit 48 also includes an inverse Quantization (IQ) circuit 82 and inverse Discrete Cosine Transform (IDCT) circuit 84 to reconstruct I- and P-reference frame data on-the-fly for motion compensated prediction of predictive P- and B-frames. While not shown, it will be appreciated that decompress circuit 54 includes similar VLD entropy decoder, IQ and IDCT circuits to reconstruct I- and P-frames from frame buffer memory 40 for presentation to post filter 52.

Those of ordinary skill in the art will appreciate that the video decoder 30 of the present invention provides high quality reconstructed picture frames with an improved compression ratio. Video decoder 30 reduces the amount of memory required in the decoder and provides memory-scalability for different decoding applications.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

Having described the invention, what is claimed is:

1. Apparatus for decoding a stream of compressed video data, wherein the stream includes a plurality of variable length encoded data representing image areas of transmitted frames, comprising:

a decoder for decoding a block of the variable length encoded data to generate a corresponding block of decompressed data for reconstruction of the transmitted frames;

memory coupled to said decoder;

a compressor coupled to said decoder and said memory for variable length encoding the block of decompressed data generated by said decoder for direct storage in said memory as variable length encoded data;

a rate control circuit coupled to said compressor for controlling a rate at which said compressor stores said variable length encoded data in said memory, wherein said rate control circuit is operable to allocate a fixed number of bits for the block of variable length encoded data, monitor the number of bits generated by the compressor during the encoding of the block of decompressed data, and terminate the encoding of the block of decompressed data so that the allocated fixed number of bits for the block of variable length encoded data is not exceeded; and a decompressor coupled to said memory and said decoder for decoding selected variable length encoded data stored in said memory to generate corresponding decompressed data, whereby said decoder is operable to reconstruct one or more of the transmitted frames from said decompressed data generated by said decoder and said decompressed data generated by said decompressor.

2. The apparatus of claim 1 wherein said compressor includes discrete cosine transform circuitry for performing a discrete cosine transform on said decompressed data generated by said decoder to generate transformed data.

3. The apparatus of claim 2 wherein said compressor further includes quantization circuitry coupled to said discrete cosine transform circuitry for quantizing said transformed data to generate quantized transformed data.

4. The apparatus of claim 3 wherein said compressor further includes entropy encoding circuitry coupled to said quantization circuitry for variable length encoding said quantized transformed data.

5. The apparatus of claim 1 wherein said decompressor includes entropy decoding circuitry coupled to said memory for decoding selected variable length data stored in said memory to generate corresponding decompressed data.

6. The apparatus of claim 5 wherein said decompressor further includes inverse quantization circuitry coupled to said entropy decoding circuitry for inverse quantizing said decompressed data generated by said entropy decoding circuitry to generate inverse quantized data.

7. The apparatus of claim 6 wherein said decompressor further includes inverse discrete cosine transform circuitry coupled to said inverse quantization circuitry for performing an inverse discrete cosine transform on said inverse quantized data to generate decompressed data for reconstruction of the transmitted frames.

8. The apparatus of claim 1 further comprising a display coupled to said decoder for displaying the reconstructed transmitted frames.

9. Apparatus for decoding a stream of compressed video data, wherein the stream includes a plurality of variable length encoded data representing image areas of transmitted frames, comprising:

a decoder for decoding a predetermined number of blocks of variable length encoded data to generate a corresponding number of blocks of decompressed data for reconstruction of the transmitted frames;

memory coupled to said decoder;

a compressor coupled to said decoder and said memory for variable length encoding in parallel the blocks of decompressed data generated by said decoder for direct storage in said memory as variable length encoded data;

a rate control circuit coupled to said compressor for controlling a rate at which said compressor stores said variable length encoded data in said memory, wherein said rate control circuit is operable to allocate a fixed number of bits for the number of blocks of variable length encoded data, allocate a variable number of bits for each block of variable length encoded data, monitor the number of bits generated by the compressor during the encoding of the blocks of decompressed data, and terminate the encoding of the blocks of decompressed data so that the allocated fixed number of bits for the number of blocks of variable length encoded data is not exceeded; and a decompressor coupled to said memory and said decoder for decoding selected variable length encoded data stored in said memory to generate corresponding decompressed data, whereby said decoder is operable to reconstruct one or more of the transmitted frames from said decompressed data generated by said decoder and said decompressed data generated by said decompressor.

10. The apparatus of claim 9 further including a display for displaying the reconstructed transmitted frames.

11. A method for decoding a stream of compressed video data, wherein the stream includes a plurality of variable length encoded data representing image areas of transmitted frames, comprising:

decoding a block of variable length encoded data to generate a corresponding block of decompressed data for reconstruction of the transmitted frames;

compressing the block of decompressed data by variable length encoding the block of decompressed data to generate a block of variable length encoded data;

allocating a fixed number of bits for the block of variable length encoded data;

monitoring the number of bits generated during the compressing step;

terminating the compressing step so that the allocated fixed number of bits for the block of variable length encoded data is not exceeded;

directly storing the variable length encoded data in memory;

decompressing selected variable length encoded data stored in memory to generate corresponding decompressed data; and selectively combining the decompressed data generated during the decoding step and the decompressed data generated during the decompressing step to reconstruct one or more of the transmitted frames.

12. The method of claim 11 wherein the compressing step includes the step of performing a discrete cosine transform on the decompressed data generated during the decoding step to generate transformed data.

13. The method of claim 12 wherein the compressing step further includes the step of quantizing the transformed data to generate quantized transformed data.

14. The method of claim 13 wherein the compressing step further includes the step of entropy encoding the quantized transformed data.

15. The method of claim 11 further including the step of displaying the reconstructed transmitted frames.

16. A method for decoding a stream of compressed video data, wherein the stream includes a plurality of variable length encoded data representing image areas of transmitted frames, comprising:

decoding a predetermined number of blocks of variable length encoded data to generate a corresponding number of blocks of decompressed data for reconstruction of the transmitted frames;

compressing the blocks of decompressed data by variable length encoding the blocks of decompressed data in parallel to generate a corresponding number of blocks of variable length encoded data;

allocating a fixed number of bits for the number of blocks of variable length encoded data;

allocating a variable number of bits for each block of variable length encoded data;

monitoring the number of bits generated during the compressing step;

terminating the compressing step so that the allocated fixed number of bits for the number of blocks of variable length encoded data is not exceeded;

directly storing the variable length encoded data in memory;

decompressing selected variable length encoded data stored in memory to generate corresponding decompressed data; and selectively combining the decompressed data generated during the decoding step and the decompressed data generated during the decompressing step to reconstruct one or more of the transmitted frames.

17. The method of claim 16 wherein the compressing step includes the step of performing a discrete cosine transform on the decompressed data generated during the decoding step to generate transformed data.

18. The method of claim 17 wherein the compressing step further includes the step of quantizing the transformed data to generate quantized transformed data.

19. The method of claim 18 wherein the compressing step further includes the step of entropy encoding the quantized transformed data.

20. The method of claim 16 further including the step of displaying the reconstructed transmitted frames.

21. A method for decoding a stream of compressed video data, wherein the stream includes a plurality of variable length encoded data representing image areas of transmitted frames, comprising:

decoding a predetermined number of blocks of variable length encoded data to generate a corresponding number of blocks of decompressed data for reconstruction of the transmitted frames;

compressing the blocks of decompressed data by variable length encoding the blocks of decompressed data to generate a corresponding number of blocks of variable length encoded data;

allocating a fixed number of bits for the number of blocks of variable length encoded data;

allocating a variable number of bits for each block of variable length encoded data;

monitoring the number of bits generated during the compressing step;

altering the compressing step so that the allocated fixed number of bits for the number of blocks of variable length encoded data is not exceeded;

directly storing the variable length encoded data in memory;

decompressing selected variable length encoded data stored in memory to generate corresponding decompressed data; and selectively combining the decompressed data generated during the decoding step and the decompressed data generated during the decompressing step to reconstruct one or more of the transmitted frames.

22. The method of claim 21 wherein the compressing step includes the step of performing a discrete cosine transform on the decompressed data generated during the decoding step to generate transformed data.

23. The method of claim 22 wherein the compressing step further includes the step of quantizing the transformed data to generate quantized transformed data.

24. The method of claim 23 wherein the compressing step further includes the step of entropy encoding the quantized transformed data.

25. The method of claim 21 further including the step of displaying the reconstructed transmitted frames.

26. The apparatus of claim 9 wherein said compressor includes discrete cosine transform circuitry for performing a discrete cosine transform on said decompressed data generated by said decoder to generate transformed data.

27. The apparatus of claim 26 wherein said compressor further includes quantization circuitry coupled to said discrete cosine transform circuitry for quantizing said transformed data to generate quantized transformed data.

28. The apparatus of claim 27 wherein said compressor further includes entropy encoding circuitry coupled to said quantization circuitry for variable length encoding said quantized transformed data.

29. The apparatus of claim 9 wherein said decompressor includes entropy decoding circuitry coupled to said memory for decoding selected variable length data stored in said memory to generate corresponding decompressed data.

30. The apparatus of claim 29 wherein said decompressor further includes inverse quantization circuitry coupled to said entropy decoding circuitry for inverse quantizing said decompressed data generated by said entropy decoding circuitry to generate inverse quantized data.

31. The apparatus of claim 30 wherein said decompressor further includes inverse discrete cosine transform circuitry coupled to said inverse quantization circuitry for performing an inverse discrete cosine transform on said inverse quantized data to generate decompressed data for reconstruction of the transmitted frames.

* * * * *